(12) United States Patent
Lee et al.

(10) Patent No.: US 9,490,709 B2
(45) Date of Patent: Nov. 8, 2016

(54) HYBRID DC-DC CONVERTER WITH LLC CONVERTER AND FULL-BRIDGE CONVERTER

(71) Applicant: Korea Institute of Energy Research, Daejeon (KR)

(72) Inventors: Iloun Lee, Daejeon (KR); Suyong Chae, Daejeon (KR); Yujin Song, Daejeon (KR); Seashung Oh, Daejeon (KR); Sukin Park, Daejeon (KR); Yoondong Sung, Daejeon (KR)

(73) Assignee: KOREA INSTITUTE OF ENERGY RESEARCH (KR)

( * ) Notice: Subject to any disclaimer, the term of this patent is extended or adjusted under 35 U.S.C. 154(b) by 22 days.

(21) Appl. No.: 14/585,925

(22) Filed: Dec. 30, 2014

(65) Prior Publication Data
US 2016/0190933 A1    Jun. 30, 2016

(51) Int. Cl.
*H02M 3/335* (2006.01)

(52) U.S. Cl.
CPC ............... *H02M 3/33507* (2013.01)

(58) Field of Classification Search
CPC ............ H02M 3/28; H02M 3/33569; H02M 3/3376; H02M 1/32; H02M 7/5387; H02M 7/19; H02M 7/493; H02M 7/757; Y02B 70/1433; H02J 1/102

USPC ...... 363/15, 16, 17, 21.02, 21.03, 55, 56.01, 363/56.02, 65, 68, 71, 98, 131, 132
See application file for complete search history.

(56) References Cited

U.S. PATENT DOCUMENTS

| | | | | |
|---|---|---|---|---|
| 5,875,103 | A * | 2/1999 | Bhagwat | H02M 3/3376 363/17 |
| 6,697,265 | B2 * | 2/2004 | Drummond | H02M 3/28 363/17 |
| 2006/0268589 | A1 * | 11/2006 | Nakahori | H02M 3/33569 363/132 |
| 2014/0098574 | A1 * | 4/2014 | Hara | H02M 3/33592 363/21.02 |

* cited by examiner

*Primary Examiner* — Nguyen Tran
(74) *Attorney, Agent, or Firm* — Harness, Dickey & Pierce, P.L.C.

(57) ABSTRACT

Disclosed is a hybrid dc-dc converter. The hybrid dc-dc converter includes: a pair of transformers configured to magnetically couple a primary side to a secondary side, a full-bridge converter including four switches constituting a full-bridge inverter circuit and a first transformer, and an LLC resonant converter including a resonant inductor, a resonant capacitor, and a second transformer, which constitute an LLC resonant circuit, wherein an output of the full-bridge converter and an output of the LLC resonant converter are connected to each other in series at the secondary side.

17 Claims, 12 Drawing Sheets

HYBRID DC-DC CONVERTER WITH LLC CONVERTER AND FULL-BRIDGE CONVERTER

BACKGROUND OF THE INVENTION

1. Field of the Invention

The present invention relates to a dc-dc converter.

2. Description of the Prior Art

With accelerated global warming, decreasing natural resources, increasing fuel price, and economical issues, vehicles with electric propulsion, such as hybrid electric vehicles (HEVs), plug-in HEVs (PHEVs), battery electric vehicles (BEVs or EVs), and fuel cell electric vehicles, are gradually growing.

These vehicles need commonly rechargeable batteries as the energy source of electric traction system. Among them, PHEVs or EVs require a higher capacity and larger sized battery pack compared with other vehicles because the battery is a main energy source in PHEVs or EVs.

The high-energy-density battery pack in PHEVs or EVs is typically recharged from the ac utility grid via an ac-dc converter named as battery charger. For low harmonic contents on the ac utility grid and high efficiency, most of battery chargers have generally the basic form of an ac-dc converter with a power factor corrector (PFC), followed by an isolated dc-dc converter.

There are key requirements in the development of EV battery chargers. First, it is imperative to reduce their size and weight in order to facilitate packaging and to highlight the utilization factor of energy. Namely, the design for higher power density and lower weight is required. Furthermore, the conversion efficiency should be maximized during whole output conditions or battery recharging process to maximize the fuel saving and emission reduction.

In order to achieve these requirements, it is necessary to adopt higher switching frequencies and soft-switching technologies since a higher switching frequency is the key to reducing the size and weight of passive components used in high-power applications, and soft-switching technologies significantly lower the generated switching losses.

In addition, in the PFC stage, a bridgeless design should be carried out because excessive conduction loss is generated due to the forward voltage drop for each of the bridge diodes, particularly at a lower line input voltage, which decreases the overall efficiency and greatly increases the size and weight of heat sink.

In addition, in the case where the output voltage requirement of the battery charger is high, the rectifier diodes in the dc-dc converter could experience a serious voltage oscillation and spike. Then, lossy snubber circuitry and higher voltage-rated diodes must be required, which cause the increase in power loss, size, and weight. Thus, in designing the rectifier stage in the dc-dc converter, the design that can avoid the aforementioned problem should be also taken into account.

In addition, in order to maintain high efficiency under low power conditions, it is necessary to minimize the amount of circulating energy in the dc-dc converter.

Conventional phase-shift full-bridge (PSFB) converter is the most preferred dc-dc topology for battery charger applications because of natural zero-voltage-switching (ZVS) operation, low current ripple in battery charging current, and simple structure and control.

However, for wide-output-voltage-range applications like battery charger, the conventional PSFB converter does not obtain an optimal efficiency due to narrow ZVS range, large circulating current, and high voltage stress on the rectifier, etc.

SUMMARY OF THE INVENTION

In order to improve the performance of the conventional PSFB converter for battery charger applications or other applications, the present invention provides hybrid dc-dc converters with an LLC resonant converter integrated into a full-bridge converter.

In accordance with an apsect of the present invention, a hybrid dc-dc converter is provided. The hybrid dc-dc converter includes: a pair of transformers configured to magnetically couple a primary side to a secondary side; a full-bridge converter including four switches, a first diode and a second diode connected to a third leg in series, a third diode and a fourth diode connected to a fourth leg in series, and a first transformer, wherein the four switches include two pairs of switches, the two pairs being connected to a first leg and a second leg in series, respectively, the first leg and the second leg are located at the primary side, and the third leg and the fourth leg are located at the secondary side; and a half-bridge converter including two switches connected to the second leg in series among the four switches, a resonant inductor, a resonant capacitor, a fifth diode and a sixth diode connected to the fourth leg in series, two filter capacitors, and a second transformer, wherein a secondary side of the first transformer and a secondary side of the second transformer are connected to each other in series.

In accordance with another aspect of the present invention, a hybrid dc-dc converter is provided. The hybrid dc-dc converter includes a pair of transformers configured to magnetically couple a primary side to a secondary side; a full-bridge converter including four switches constituting a full-bridge inverter circuit, and a first transformer; and an LLC resonant converter including a resonant inductor, a resonant capacitor, and a second transformer, which constitutes an LLC resonant circuit, wherein an output of the full-bridge converter and an output of the LLC resonant converter are connected to each other in series at the secondary side.

As described above, according to the present invention, the hybrid dc-dc converter has following advantages; wide zero-voltage-switching (ZVS) range, low circulating current, zero-current-switching (ZCS) operation on output rectifiers, and reduced size of output filter inductor. Moreover, the hybrid dc-dc converter has low circulating current even though it uses less components. In addition, the hybrid dc-dc converter may be driven in a phase-shift manner with stationary frequency, which helps the LLC converter to be optimally designed on one point without consideration of a battery charger operation status.

DETAILED DESCRIPTION OF THE EXEMPLARY EMBODIMENTS

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
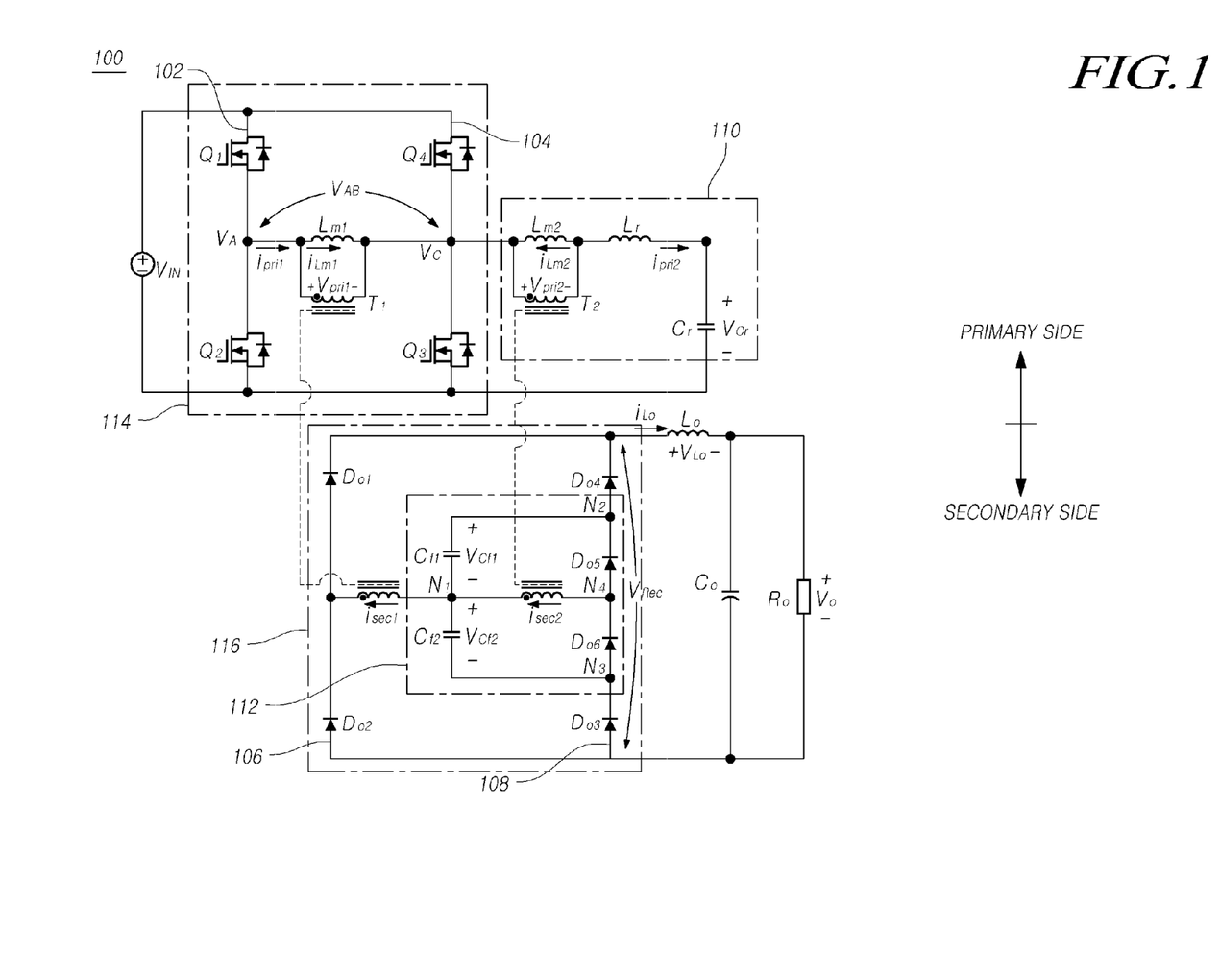
FIG. 1 is a circuit diagram illustrating a hybrid dc-dc converter according to an embodiment of the present invention.

FIG. 1 is a circuit diagram illustrating a hybrid dc-dc converter according to an embodiment of the present invention.

The hybrid dc-dc converter 100 converts electric power of a power source $V_{IN}$ to supply the electric power to a resistor Ro.

Referring to FIG. 1, the hybrid dc-dc converter 100 includes a pair of transformers $T_1$ and $T_2$ which magnetically couple a primary side to a secondary side.

Further, the hybrid dc-dc converter 100 includes four switches $Q_1$, $Q_2$, $Q_3$ and $Q_4$, the four switches including two pairs of switches, the two pairs being connected to a first leg 102 and a second leg 104 in series, respectively, a first diode $D_{o1}$ and a second diode $D_{o2}$ connected to a third leg 106 in series, a third diode $D_{o3}$ and a fourth diode $D_{o4}$ connected to a fourth leg 108 in series, and a full-bridge converter FB including the first transformer $T_1$. Here, the first leg 102 and the second leg 104 are located at the primary side, and the third leg 106 and the fourth leg 108 are located at the secondary side.

As illustrated in FIG. 1, a primary side of the full-bridge converter FB includes an inverter circuit 114 including the four switches $Q_1$, $Q_2$, $Q_3$ and $Q_4$ and the primary side of the first transformer $T_1$.

A secondary side of the full-bridge converter FB includes a full-bridge rectifying circuit 116 including the four diodes $D_{o1}$, $D_{o2}$, $D_{o3}$ and $D_{o4}$ and the secondary side of the first transformer.

The hybrid dc-dc converter 100 includes a half-bridge converter HB including the two switches $Q_3$ and $Q_4$ connected to the second leg 104 in series among the four switches, a resonant inductor $L_r$, a resonant capacitor $C_r$, a fifth diode $D_{o5}$ and a sixth diode $D_{o6}$ connected to the fourth leg 108 in series, two filter capacitors $C_{f1}$ and $C_{f2}$, and the second transformer $T_2$.

In the half-bridge converter HB, a magnetizing inductor $L_{m2}$ of the resonant inductor $L_r$, the resonant capacitor $C_r$ and the second transformer $T_2$ configure an LLC resonant circuit 110. Since the half-bridge converter HD can be operated in an LLC resonant type using such an LLC resonant circuit 110, the half-bridge converter HB may be called an LLC resonant converter.

Further, a secondary side circuit 112 of the half-bridge converter HB includes a secondary side of the second transformer $T_2$, the two filter capacitors $C_{f1}$ and $C_{f2}$, and the two diodes $D_{o5}$ and $D_{o6}$.

In the full-bridge converter FB and the half-bridge converter HB, the diodes $D_{o3}$, $D_{o4}$, $D_{o5}$, and $D_{o6}$ located in the fourth leg 108 may be connected in series and in a successive order of the third diode $D_{o3}$, the sixth diode $D_{o6}$, the fifth diode $D_{o5}$, and the fourth diode $D_{o4}$. Further, the third diode $D_{o3}$, the sixth diode $D_{o6}$, the fifth diode $D_{o5}$, and the fourth diode $D_{o4}$ may be connected to each other in series in the same direction. Here, the direction implies a PN junction direction.

The secondary side of the first transformer T1 and the secondary side of the first transformer $T_2$ are connected to each other in series.

In this way, the secondary side of the first transformer $T_1$ and the secondary side of the second transformer $T_2$ are connected to each other in series, so that an output of the full-bridge converter FB and an output of the half-bridge converter HB can be connected to each other in series.

$N_1$ denotes a point where the secondary side of the first transformer $T_1$ and the secondary side of the second transformer $T_2$ meet each other, $N_2$ denotes a point where the fifth diode $D_{o5}$ and the fourth diode $D_{o4}$ meet each other, $N_3$ denotes a point where the third diode $D_{o3}$ and the sixth diode $D_{o6}$ meet each other, and $N_4$ denotes a point where the sixth diode $D_{o6}$ and the fifth diode $D_{o5}$.

Referring to FIG. 1, the secondary side circuit 112 of the half-bridge circuit HB is inserted between $N_1$, $N_2$, and $N_3$.

In this way, the secondary side circuit 112 of the half-bridge converter HB is inserted into the secondary side circuit 116 of the full-bridge circuit 112, so that the sum of outputs of the full-bridge converter FB and the half-bridge converter HB or only the output of the half-bridge converter HB may be transferred to an output inductor $L_o$.

Referring to FIG. 1, in the secondary side circuit 112 of the half-bridge converter HB, the first filter capacitor $C_{f1}$ may be located between $N_1$ and $N_2$, and the second filter capacitor $C_{f2}$ may be located between $N_1$ and $N_3$. Further, the secondary side of the second transformer $T_2$ may be located between $N_1$ and $N_4$.

Referring to FIG. 1, the hybrid dc-dc converter 100 may include the full-bridge converter FB and the half-bridge converter HB.

The hybrid dc-dc converter 100 may further include an LC output filter $L_o$ and $C_o$.

Hereinafter, an operational principle of the hybrid dc-dc converter 100 will be described together with a waveform formed by each circuit element.

Meanwhile, the waveform may be differently formed according to an operation mode or an operation point of the hybrid dc-dc converter 100.

Figure 2:
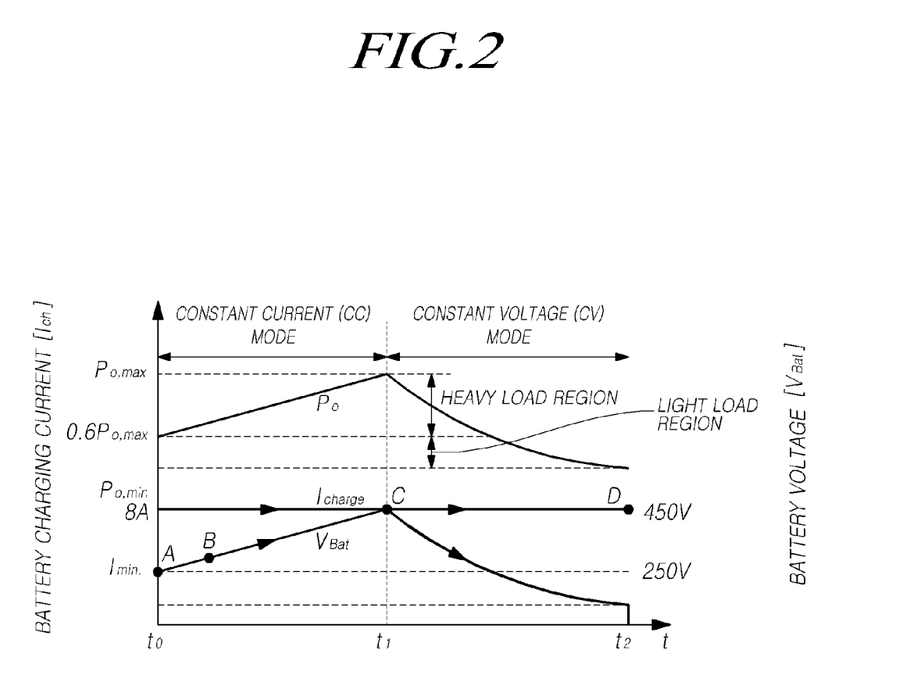
FIG. 2 illustrates an operation mode when the hybrid dc-dc converter is applied to a battery charger.

FIG. 2 illustrates an operation mode when the hybrid dc-dc converter 100 is applied to a battery charger.

The hybrid dc-dc converter 100 for the battery charger operates in constant current mode and constant voltage mode according to battery voltage status as shown in the FIG. 2. For the hybrid dc-dc converter (100) for the battery charger, it is noted that low voltage and high current output condition such as point A in the FIG. 2 is the worst operation point. Accordingly, hereinafter, the operation principle of the hybrid dc-dc converter 100 will be described together with a waveform at point A.

In order to analyze the operation of the hybrid dc-dc converter, several assumptions are made as follows.

1) $N_{s1}/N_{p1}=n_{T1}$, and $N_{s2}/N_{p2}=n_{T2}$;
2) The switch devices are ideal MOSFETs except for the parasitic capacitors and the internal body diodes;
3) The rectifier diodes are ideal except for the junction capacitor, $C_{Do1}=C_{Do2}=C_{Do3}=C_{Do4}=C_{Do5}=C_{Do6}=C_j$;
4) The capacitance of switch parasitic capacitor, $C_{oss}$, is much larger than the junction capacitance of diode, $C_j$;
5) The output filter capacitor is large enough to be treated as a constant voltage source with output voltage, $V_o$;
6) The filter capacitor $C_{f1}$ and $C_{f2}$ are equal to $C_f$ and they are large enough to be treated as a constant voltage source, $V_{Cf}$;
7) The output filter inductor is large enough to have no current ripple, $\Delta i_{Lo}=0$.

Figure 3:
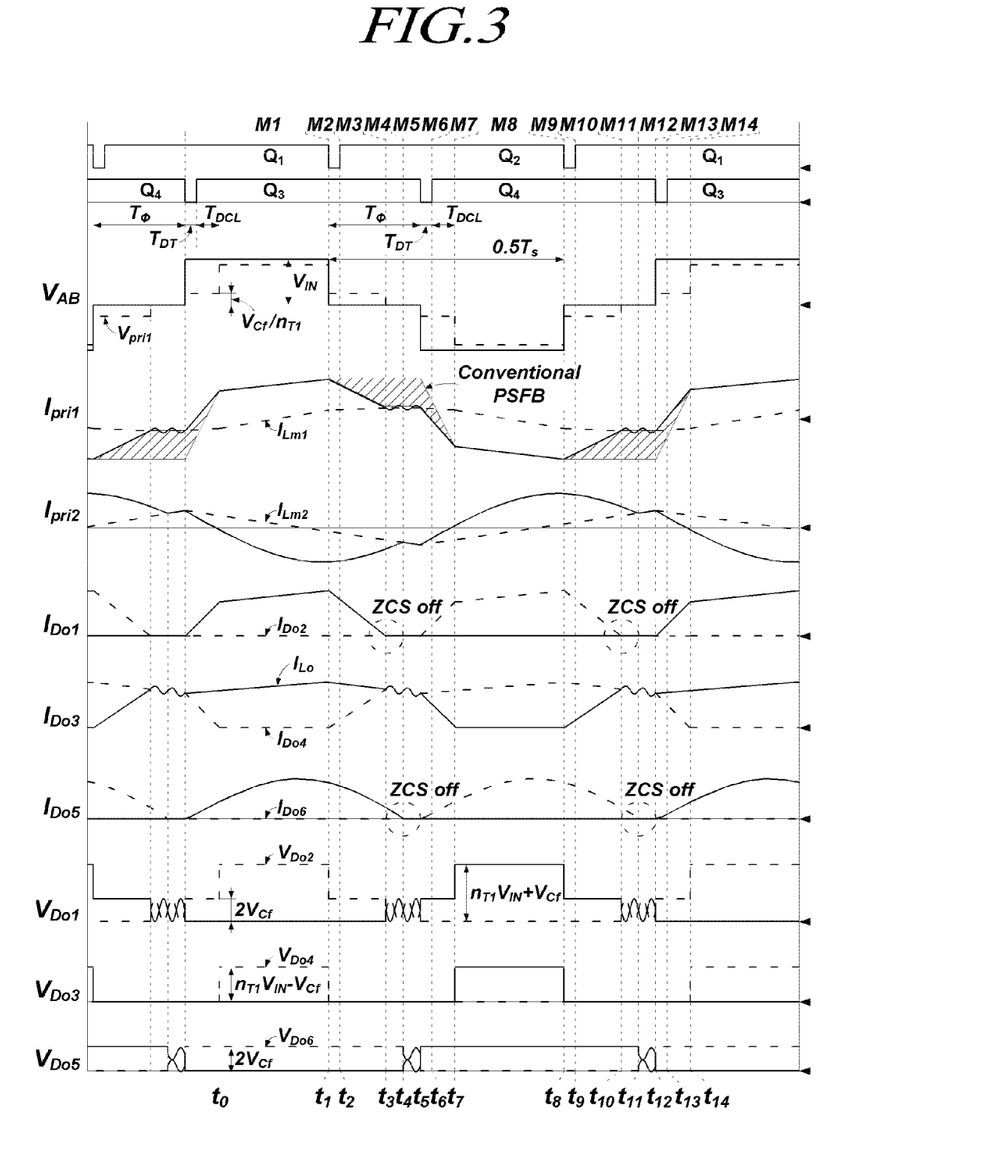
FIG. 3 illustrates a key waveform at point A.

FIG. 3 illustrates a key waveform at a point A, and FIGS. 4A to 4E illustrates current paths for a half period.

In a switching period, there are 10 operating modes that can be divided into two half cycles: $t_0$-$t_5$ (from mode 1 to mode 5) and $t_5$-$t_{11}$ (from mode 6 to mode 10). The operational principles of two half cycles are symmetric, thereby only the first half cycle is described and operating circuits during the cycle are shown in FIG. 4.

Figure 4A:
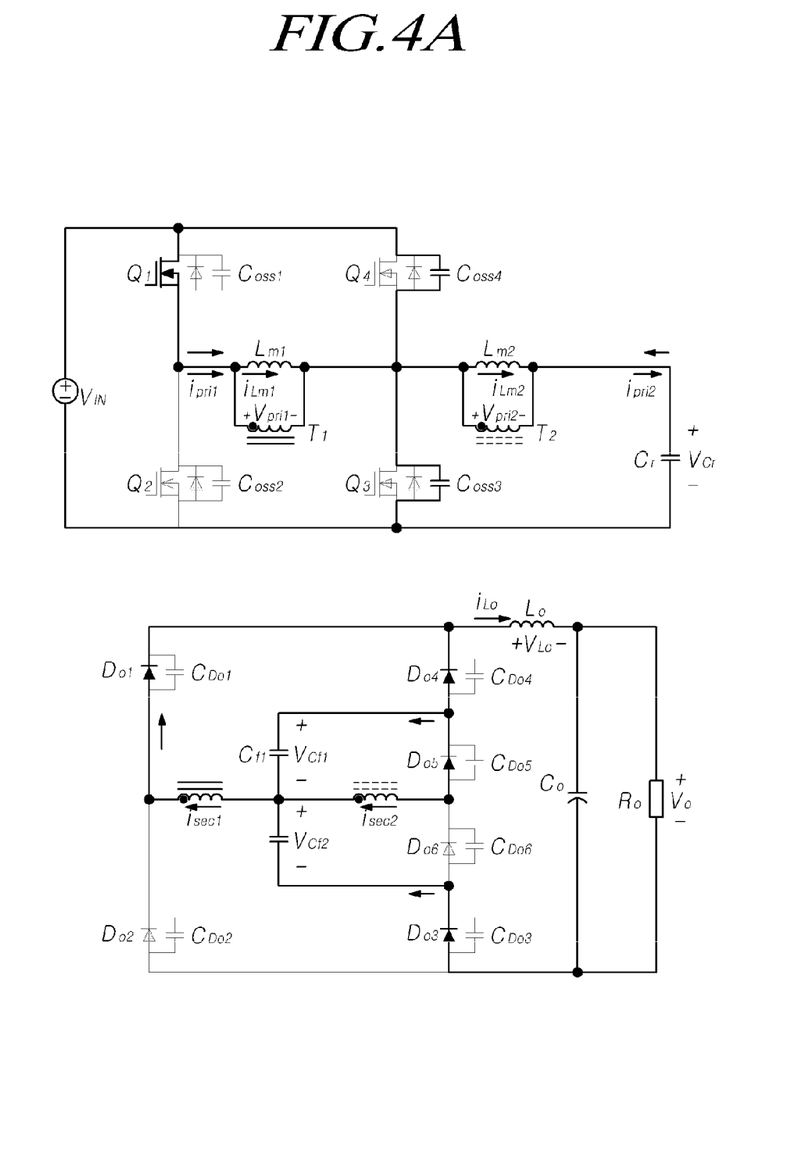
FIGS. 4A to 4E illustrate current paths for a half period.

FIG. 4A illustrates a current path in mode 1.

Mode 1 [$t_0$-$t_1$]: The mode 1 begins when the switch $Q_4$ is turned off. And, the mode 1 ends when the the diode $D_{o4}$ current, $I_{Do4}$ reaches zero level. Namely, the mode 1 ends when commutation between $D_{o1}$ and $D_{o4}$ is over. When the mode 1 starts, the primary side voltage of the transformer T1, $V_{AB}$ is equal to $V_{IN}$ then half-bridge converter (FB) starts to transfer power to the secondary side. Thereby, the diode $D_{o5}$ is conducted, and voltage stress across the diode $D_{o6}$ is clamped by $2V_{Cf}$, wherein the $V_{Cf}$ is the voltage of the filter capacitor $C_{f1}$ or the voltage of the filter capacitor $C_{f2}$ and the $2V_{Cf}$ may be sum of $V_{cf1}$ and $V_{cf2}$. The diode $D_{o2}$ is also clamped by $2V_{Cf}$. The full-bridge converter (FB) also begins to transfer power. By the filter capacitor $C_{f2}$, the output voltage of the full-bridge converter (FB) is boosted. During this mode, the switch $Q_1$ maintains on status, and switch $Q_3$ is ZVS (zero-voltage-switching) turn on, but there is no variation on circuit operation by status change of the switch $Q_3$. It is in transient status so that duty cycle loss $T_{DCL}$ is generated. The current slope is gradually decreased due to the reflected voltage, $V_{Cf}$. Thereby, the diode $D_{o3}$ can be turned off in ZCS (zero-current-switching) condition.

Figure 4B:
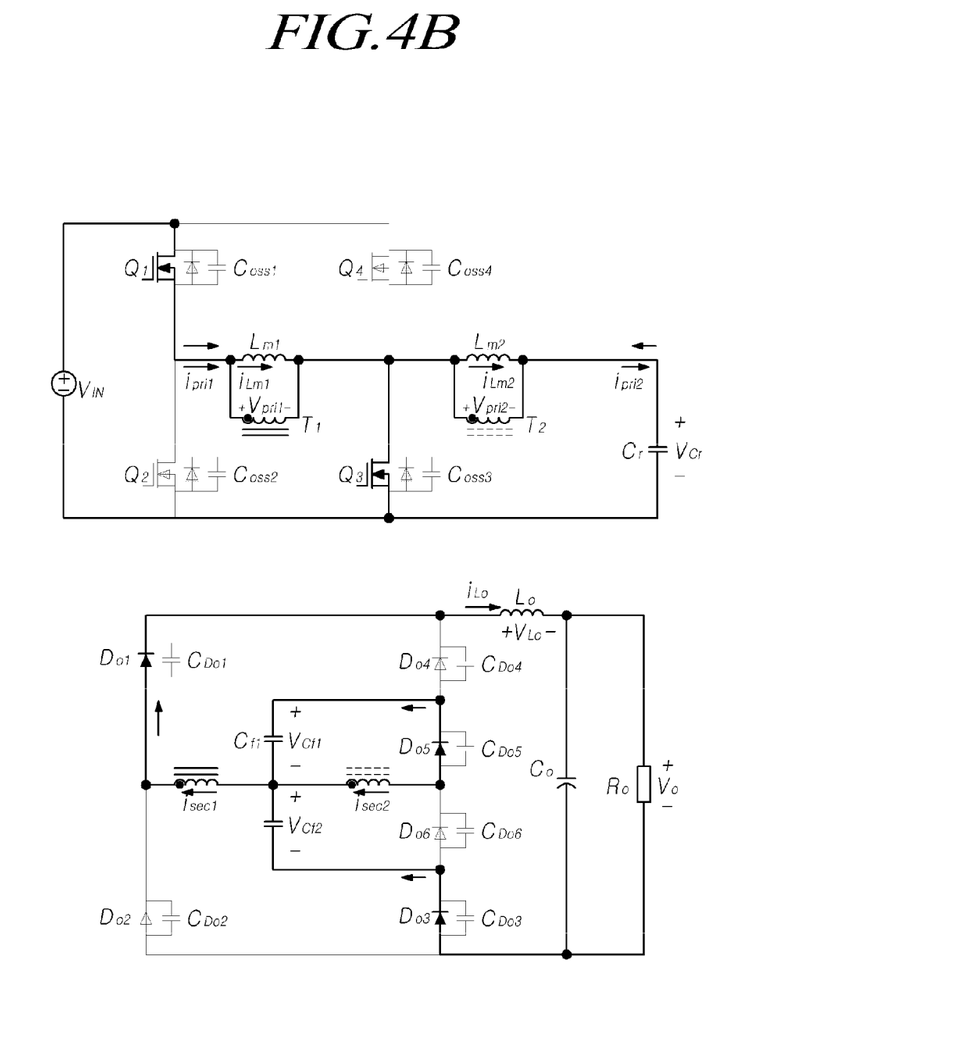

FIG. 4B illustrates a current path in mode 2.

Mode 2 [$t_1$-$t_2$]: The mode 2 is main powering region. The mode 2 begins when the commutation is over, and the mode 2 ends when the switch $Q_1$ is turned off. During the mode 2, switches $Q_1$ and $Q_3$ are in on-state, and diodes $D_{o1}$ and $D_{o3}$ are the main powering path. The half-bridge converter (HB) transfers power to the filter capacitor $C_{f1}$ through the diode $D_{o5}$. Thereby, the voltage stress of the diode $D_{o6}$ is equal to $2V_{Cf}$. The output voltage of full-bridge converter (FB) is boosted by the filter capacitor $C_{f2}$. Thus, the applied voltage of output inductor $V_{Lo}$ can be expressed as follows.

$$V_{Lo}=n_{T1}V_{IN}+V_{Cf}-V_o. \quad (1)$$

The interval of the mode 2 is equal to $0.5T_s-T_\phi-T_{DCL}$, where $T_\phi$ is phase delay time, $T_{DCL}$ is duty cycle loss and $T_s$ is switching interval.

Figure 4C:
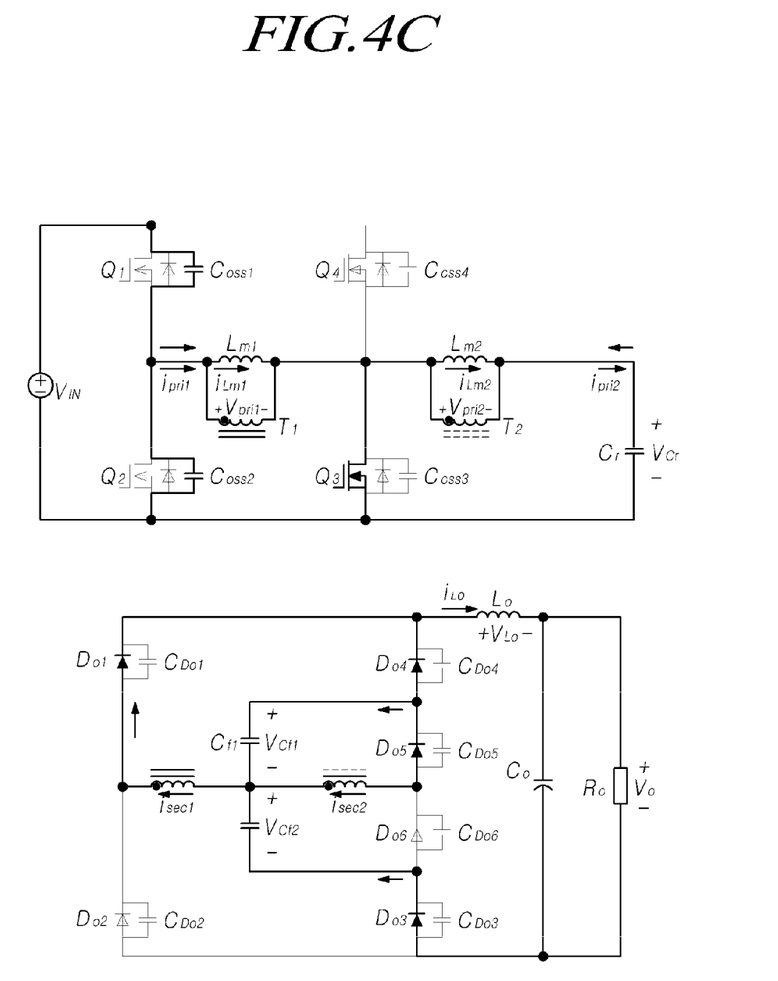

FIG. 4C illustrates a current path in mode 3.

Mode 3 [$t_2$-$t_3$]: The mode 3 is freewheeling region. The mode 3 begins when the switch $Q_1$ is turned off, and the mode 3 ends, the primary side current of the transformer $T_1$, $T_{pri1}$ reaches the same magnitude of magnetizing current of the transformer $T_1$, $I_{Lm1}$. During the mode 3, the primary voltage of the transformer $T_1$ is equal to the reflected voltage of the filter capacitor $C_{f1}$. It is reverse voltage for $I_{pri1}$, thereby the primary side current of the transformer $T_1$, $I_{pri1}$ reduces. Namely, the circulating current reduces. The primary current, $I_{pri1}$ can be expressed as follows;

$$I_{pri1}(t) = n_{T1}I_o - \frac{V_{Cf}}{L_{lk1}n_{T1}}(t-t_2), \quad (2)$$

where $L_{lk1}$ is leakage inductance of $T_1$.

The voltage stress of $D_{o2}$ and $D_{o6}$ are clamped by $2V_{Cf}$. And, the applied voltage of output inductor $L_o$, $V_{LO}$ can be expressed as follows.

$$V_{Lo}=2V_{Cf}-V_o. \quad (3)$$

The voltage across the output inductor $L_o$ in eq. (3) is maintained before a next half-cycle, which starts from mode 6, begins, and the total duration of the voltage in eq. (3) is defined as $T_\phi+T_{DCL}$.

Figure 4D:
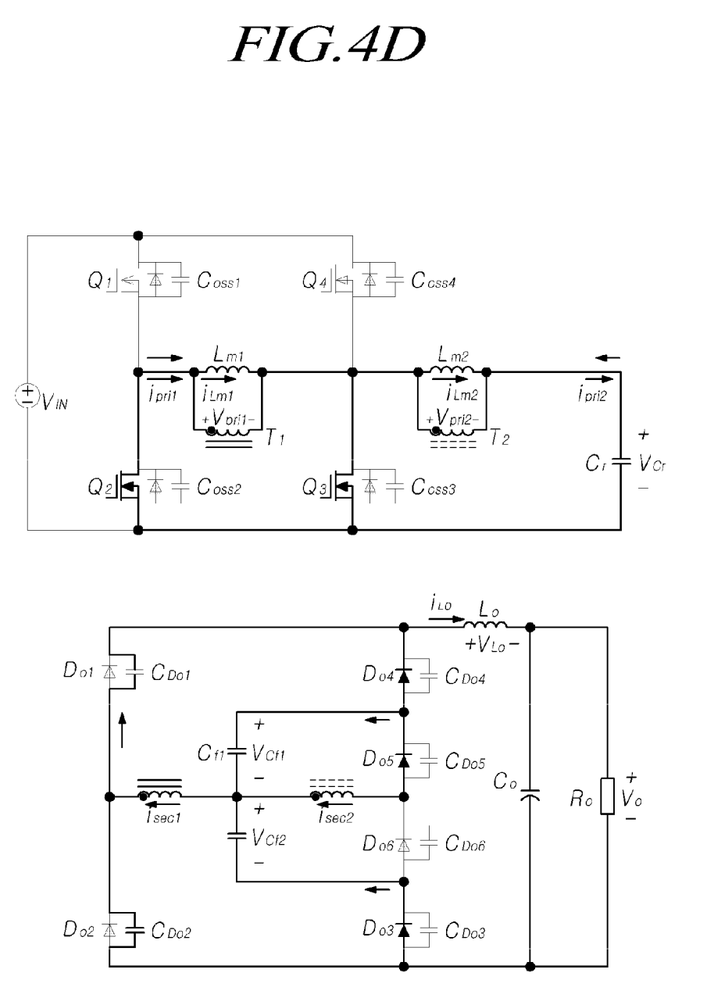

FIG. 4D illustrates a current path in mode 4.

Mode 4 [$t_3$-$t_4$]: Mode 4 begins when $I_{pri1}$ reaches $I_{Lm1}$, and the mode 4 ends when the resonance of the half-bridge converter (HB) is over. During the mode 4, the oscillation among output capacitors of $D_{o1}$ and $D_{o2}$, and leakage inductance of $T_1$ occurs. The maximum voltage of diodes $D_{o1}$ and $D_{o2}$ is clamped under $2V_{Cf}$. When the phase delay time $T_\phi$ is not long enough, the mode 4 will not be exist because the $I_{pri1}$ will not be equal to $I_{Lm1}$. Then, the mode 3 may be maintained until the switch $Q_3$ is turned off.

Figure 4E:
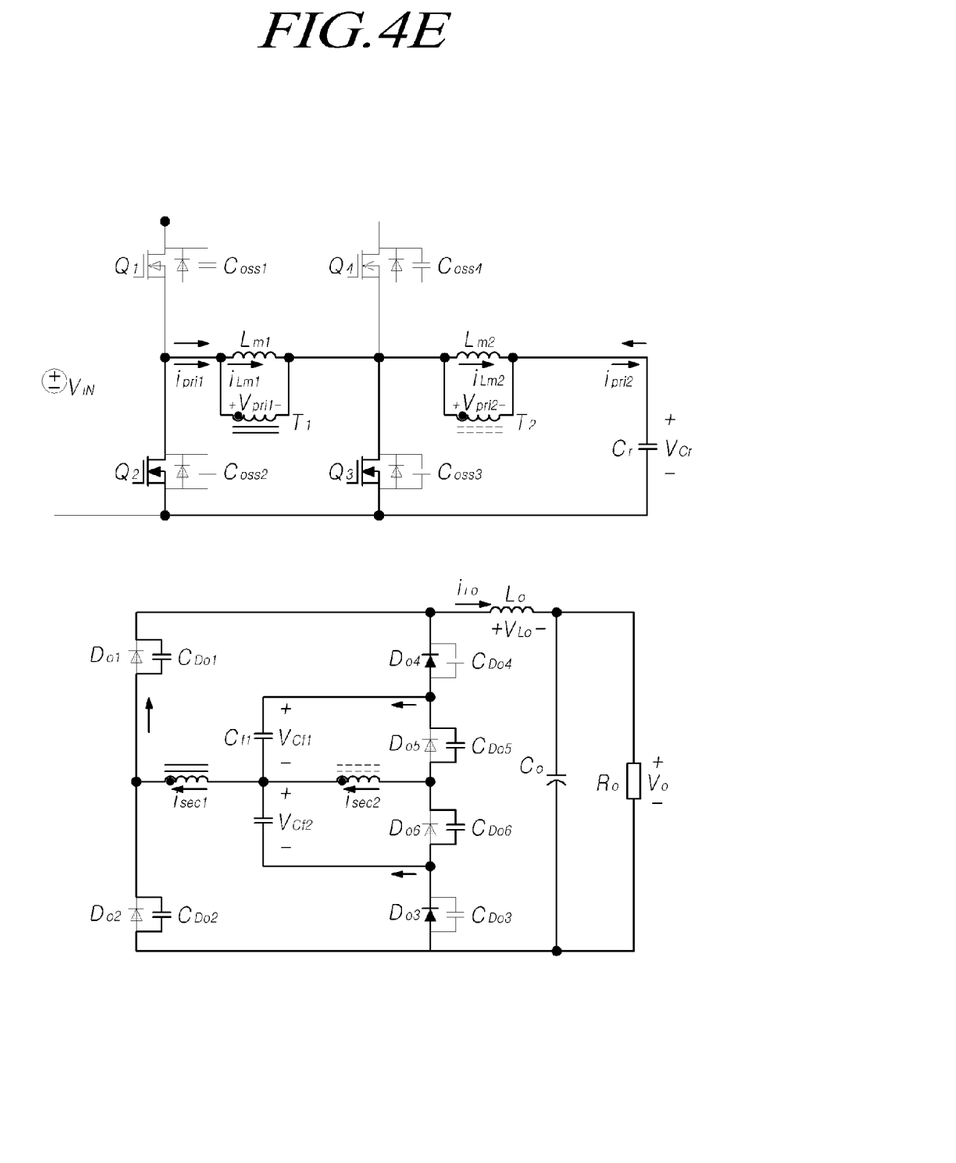

FIG. 4E illustrates a current path in mode 5.

Mode 5 [$t_4$-$t_5$]: The Mode 5 begins when $i_{pri2}$ reaches $I_{Lm2}$, and the mode 5 ends when the switch $Q_3$ is turned off. The mode 5 is maintained very short time because the switching frequency is almost the same as resonant frequency. Moreover, the controller maintains stationary frequency.

The DC conversion ratio M of the hybrid dc-dc converter 100 can be derived by using the principle of volt-second balance on the output inductor $L_o$. The conversion ratio equation is expressed as follows.

$$M = \frac{V_o}{V_{IN}} = n_{T1} + 0.5n_{T2}G + (-2n_{T1}+n_{T2}G)\frac{T_\phi}{T_s}, \quad (4)$$

where $T_\phi$ is phase delay time, $T_{DCL}$ is duty cycle loss, $T_s$ is switching interval, and G is the voltage conversion ratio of the half-bridge converter (HB).

The voltage conversion ratio of the half-bridge converter (HB), G, can be represented as follows.

$$G = \frac{2V_{Cf}}{n_{T2}V_{IN}} = \frac{k}{\sqrt{\left(1+k-\frac{f_r^2}{f_s^2}\right)^2 + Q^2k^2\left(\frac{f_s}{f_r}-\frac{f_r}{f_s}\right)^2}}, \text{ where} \quad (5)$$

$$Q = \frac{n_{T2}\pi^2}{8R_o}\sqrt{\frac{L_r}{C_r}}, k = \frac{L_{m2}}{L_f}, f_r = \frac{1}{2\pi\sqrt{L_rC_r}},$$

$f_s$ is switching frequency, $R_o$ is output resistance and $L_{m2}$ is magnetizing inductor of the transformer $T_2$.

From (4), it can be seen that the output voltage of the hybrid dc-dc converter 100 can be regulated by three ways; frequency modulation method with fixed duty-ratio, phase-shift modulation with stationary frequency, or hybrid phase-shift and frequency modulation.

Among them, the phase-shift modulation with stationary frequency is well known that G is equal to 1.0 when the switching frequency is equal to the resonant frequency. Moreover, there is no variation of voltage gain according to output load condition. Thus, the input to output voltage relation $M_{norm\_proposed}$ can be expressed as follows;

$$M_{norm\_proposed} = \frac{V_o}{n_{T1} V_{IN}} = (2-\alpha)D + \alpha, \quad (6)$$

where $\alpha = n_{T2}/n_{T1}$, and $D = 0.5 - T_\phi/T_s$.

Figure 5:
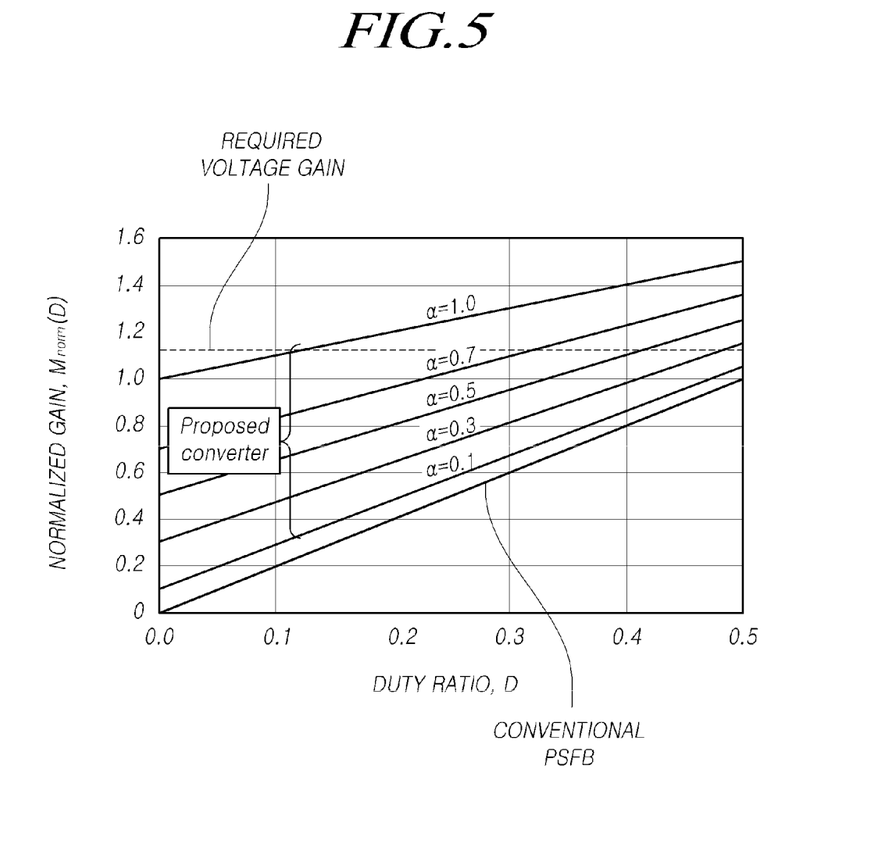
FIG. 5 shows the normalized gain of the hybrid dc-dc converter and conventional PSFB converter.

FIG. 5 shows the normalized gain of the hybrid dc-dc converter 100 and conventional PSFB converter. From the FIG. 5, the hybrid dc-dc converter 100 always has higher gain than conventional PSFB converter. As a result, the transformer design with lower turns-ratio is possible in the hybrid dc-dc converter 100 for the transformer of the full-bridge converter (FB), $T_1$.

When the phase-shift modulation is applied, the freewheeling interval is exist. In the freewheeling interval, the primary current circulates on the primary side of converter, and the magnitude of the current is maintained. The circulating current is pinpointed as a significant drawback of the conventional PSFB converter because the conduction power loss is generated by the current. The worst operation status for battery charger is that the battery voltage is minimum value. In the case, the freewheeling interval is maximized due to extension of phase delay time $T_\phi$.

In the hybrid dc-dc converter 100, the circulating current is minimized since the $i_{pri1}$ is reduced by the reflected voltage of $C_{f1}$ as analyzed in mode 3. Thereby, the conduction power loss could be minimized as much as the hatched area in FIG. 3.

However, the ZVS energy for lagging leg switches $Q_3$ and $Q_4$ is also minimized so that the switching loss could be higher. In hybrid dc-dc converter 100, the $i_{pri2}$ is the other energy source for ZVS of lagging leg switches. At the time when the lagging-leg switches are turned on, the $I_{Lm2}$ has the maximum value. Thereby, the design of half-bridge converter (HB) with the low $L_m$ makes it possible to ensure the ZVS operation of the switches in whole load range unlike the conventional PSFB converter.

The other soft-switching characteristic is ZCS operation. For diodes $D_{o5}$ and $D_{o6}$, the ZCS operation is ensured because the half-bridge converter (HB) is a LLC converter and the LLC converter always operates in below-resonant status. In addition, soft-switching characteristic of the diodes $D_{o1}$ and $D_{o2}$ can be achieved, but it depends on the phase delay time $T_\phi$. The current of the diodes $D_{o1}$ and $D_{o2}$ is reduced during $T_\phi$ by the voltage of $C_{f1}$ and $C_{f2}$ as the same as $I_{pri1}$, so that the diodes $D_{o1}$ and $D_{o2}$ can operate in ZCS status if the diodes $D_{o1}$ and $D_{o2}$ have sufficiently long $T_\phi$.

If the operation status is point C in the FIG. 2, the ZCS operation is rarely achieved because there is no circulating region. However, the current of the diodes $D_{o1}$ and $D_{o2}$ is decreased with the slope after switch off as follows;

$$\frac{dI_{Do1}}{dt} = \frac{dI_{Do2}}{dt} = \frac{V_{IN} V_{Cf}/n_{T1}}{n_{T1} L_{lkg1}}, \quad (7)$$

where $L_{lkg1}$ is leakage inductance of $T_1$, $I_{Do1}$ is the current of the diode $D_{o1}$ and $I_{Do2}$ is the current of the diode $D_{o2}$.

The current slope is slower than one of conventional PSFB converter. For the diodes $D_{o3}$ and $D_{o4}$, they have the same characteristic as the diodes $D_{o1}$ and $D_{o2}$. Therefore, the hybrid dc-dc converter 100 can minimize the reverse recovery problem on output rectifiers.

For wide ZVS range, the addition of external inductor is required in conventional PSFB converter. However, it is the reason of the large commutation time of primary current and the reduction of effective duty-cycle. To compensate the decreased duty-cycle, the turns-ratio of transformer should have higher value. However, the current stress on primary components and the voltage stress of output rectifiers increase.

Meanwhile, with the hybrid dc-dc converter 100, ZVS range can be extended without the additional external inductor. Thereby, the commutation time of primary current is affected by only leakage inductance so that the duty-cycle loss $T_{DCL}$ can be minimized. Thus, the duty-cycle, generated from signal processor, is considered as the effective duty-cycle. As a result, the transformer $T_1$ for the full-bridge converter (FB) on the hybrid dc-dc converter 100 can be designed to be more profitable than the conventional PSFB converter.

The transformers $T_1$ and $T_2$ for the hybrid dc-dc converter 100 are designed with the voltage conversion ratio as shown in FIG. 5. The FIG. 5 shows the normalized voltage conversion ratio as per duty ratio, based on the assumption that the $n_{T1}$ is equal to 1.0 and the G is equal to 1.0. It is noted that the required voltage conversion ratio is possible to be achieved when the ratio of $n_{T2}$ to $n_{T1}$, $\alpha$, is higher than 0.5, if the effective duty ratio is 0.4. As a result, the $n_{T1}$ and $n_{T2}$ can be designed as 1.0 and 0.5 respectively. If the $n_{T2}$ is equal to 0.5, the voltage of the filter capacitor $C_{f1}$ and the filter capacitor $C_{f2}$ is one-fourth of $V_{IN}$. Thereby, the voltage stress of the diodes $D_{o5}$ and $D_{o6}$ is clamped under half of $V_{IN}$, and the schottky diode can be applied. Moreover, the value of $n_{T1}$ is twice of $n_{T2}$, which can make the current driven by $T_1$ and $T_2$ to have the same magnitude.

Figure 6A:
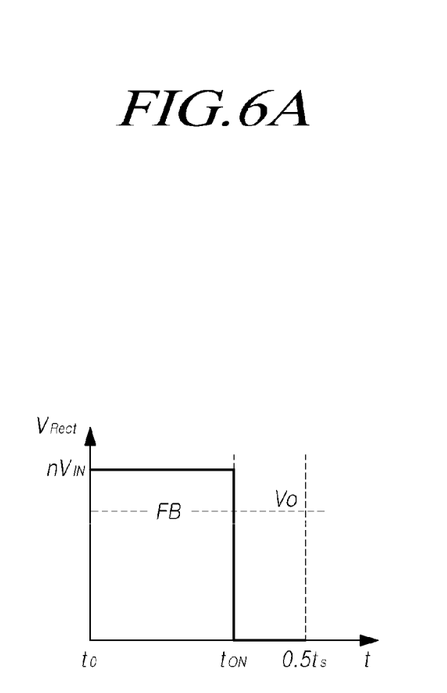
FIGS. 6A and 6B show the rectifier voltage of the conventional PSFB converter and the hybrid dc-dc converter.
Figure 6B:
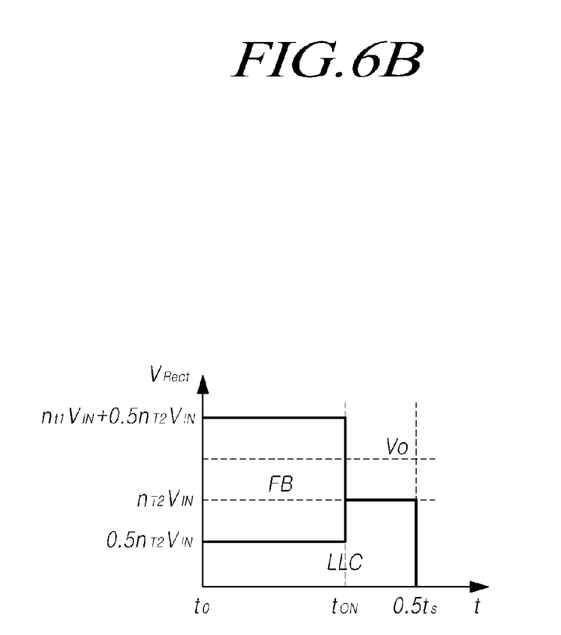

The FIG. 6 shows the rectifier voltage of the conventional PSFB converter and the hybrid dc-dc converter.

The FIG. 6a shows the rectifier voltage of the conventional PSFB converter, and the FIG. 6b shows the rectifier voltage of the hybrid dc-dc converter.

For the conventional PSFB converter, the voltage applied on the output inductor $L_o$ is zero during the freewheeling region, while the sum of $V_{Cf}$ and $n_{T2}V_{IN}$ is applied to $L_o$ in the hybrid dc-dc converter (100). For two converters, the peak current ripple of output inductor can be expressed as follows;

$$\Delta I_{Lo,Conv.} = \frac{2 n_{T1} D (0.5 - D) V_{IN}}{L_o f_s} \quad (8)$$

$$\Delta I_{Lo,Prop.} = \frac{n_{T1}(1 + 0.5\alpha) D V_{IN} - D V_o}{2 L_o f_s} \quad (9)$$

Where $I_{Lo,Conv}$ is the current of output inductor in the conventional PSFB converter and $I_{Lc,Prop}$ is the current of output inductor in the hybrid dc-dc converter.

Figure 7:
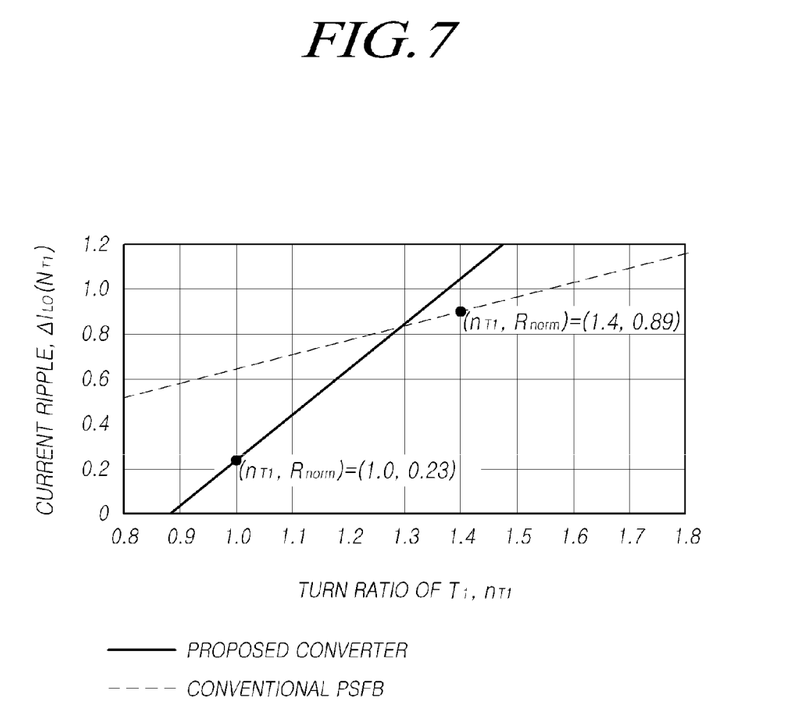
FIG. 7 shows the current ripple of output filter inductor.

With the condition that $f_s$=100 KHz, $L_o$=500 μH, and D=0.4, the current ripple of output filter inductor can be represented as FIG. 7. From the result, it is noted that the peak current ripple of the hybrid dc-dc converter 100 is one-fourth of the conventional PSFB converter. As a result, the hybrid dc-dc converter (100) can use smaller size of output filter inductor than the conventional PSFB converter.

Further, the terms "includes", "constitutes", or "has" mentioned above mean that a corresponding structural element is included unless they have no reverse meaning. Accordingly, it should be interpreted that the terms may not exclude but further include other structural elements. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although the embodiments of the present invention have been described for illustrative purposes, those skilled in the art will appreciate that various modifications, additions and substitutions are possible, without departing from the scope and spirit of the invention. Accordingly, the embodiments disclosed in the present invention are merely to not limit but describe the technical spirit of the present invention. Further, the scope of the technical spirit of the present invention is not limited by the embodiments. The scope of the present invention shall be construed on the basis of the accompanying claims in such a manner that all of the technical ideas included within the scope equivalent to the claims belong to the present invention.

What is claimed is:

1. A hybrid dc-dc converter comprising:
   a pair of transformers configured to magnetically couple a primary side to a secondary side;
   a full-bridge converter including four switches, a first diode and a second diode connected to a third leg in series, a third diode and a fourth diode connected to a fourth leg in series, and a first transformer, wherein the four switches include two pairs of switches, the two pairs being connected to a first leg and a second leg in series, respectively, the first leg and the second leg are located at the primary side, and the third leg and the fourth leg are located at the secondary side; and
   a half-bridge converter including two switches connected to the second leg in series among the four switches, a resonant inductor, a resonant capacitor, a fifth diode and a sixth diode connected to the fourth leg in series, two filter capacitors, and a second transformer,
   wherein a secondary side of the first transformer and a secondary side of the second transformer are connected to each other in series; and
   the third diode, the fourth diode, the fifth diode, and the sixth diode are connected to each other in series in a same direction.

2. The hybrid dc-dc converter of claim 1, wherein a first filter capacitor among the two filter capacitors has one side connected to the second transformer and the other side connected to the fifth diode.

3. The hybrid dc-dc converter of claim 2, wherein the fifth diode voltage is clamped by a sum of the first filter capacitor voltage and a second filter capacitor voltage.

4. The hybrid dc-dc converter of claim 2, wherein the first filter capacitor has one side connected to the second transformer and the other side connected to a contact point where the fourth diode and the fifth diode meet each other, a second filter capacitor has one side connected to a contact point where the secondary side of the first transformer and the secondary side of the second transformer meet each other and has the other side connected to a contact point where the third diode and the sixth diode meet each other.

5. The hybrid dc-dc converter of claim 1, wherein the two filter capacitors are connected to each other in series, having one side connected to the third diode, and the other side connected to the fourth diode, and a contact point between the two filter capacitors is connected to the first transformer.

6. The hybrid dc-dc converter of claim 4, wherein the second diode voltage is clamped by a sum of the first filter capacitor voltage and the second filter capacitor voltage.

7. The hybrid dc-dc converter of claim 1, wherein an output of the secondary side is controlled by a substantial constant current or a substantial constant voltage.

8. The hybrid dc-dc converter of claim 1, wherein the half-bridge converter operates as an LLC resonant converter together with a magnetizing inductor of the second transformer, the resonant inductor, and the resonant capacitor.

9. The hybrid dc-dc converter of claim 1, wherein, the full-bridge converter is regulated by frequency modulation with a fixed duty-ratio, phase-shift modulation with a stationary frequency, or hybrid phase-shift and frequency modulation.

10. The hybrid dc-dc converter of claim 1, wherein a switching frequency for the four switches is same as a resonant frequency between the resonant inductor and the resonant capacitor.

11. The hybrid dc-dc converter of claim 1, wherein a ratio of a turns-ratio of the second transformer to a turns-ratio of the first transformer is higher than 0.5.

12. The hybrid dc-dc converter of claim 11, wherein the turns-ratio of the second transformer is substantially same as 0.5.

13. The hybrid dc-dc converter of claim 11, wherein the hybrid dc-dc converter is applied to a battery charger.

14. A hybrid dc-dc converter comprising:
   a pair of transformers configured to magnetically couple a primary side to a secondary side;
   a full-bridge converter including four switches constituting a full-bridge inverter circuit, and a first transformer; and
   an LLC resonant converter including a resonant inductor, a resonant capacitor, and a second transformer, which constitute an LLC resonant circuit,
   wherein an output of the full-bridge converter and an output of the LLC resonant converter are connected to each other in series at the secondary side;
   wherein two legs are located at the secondary side,
   a first diode and a second diode are connected to a first leg among the two legs in series,
   third to sixth diodes are successively connected to a second leg among the two legs in series, and
   a secondary side of the second transformer has one side connected to a secondary side of the first transformer and has the other side connected to a contact point between the fourth diode and the fifth diode.

15. The hybrid dc-dc converter of claim 14, wherein a secondary side of the first transformer and a secondary side of the second transformer are connected to each other in series.

16. The hybrid dc-dc converter of claim 14, wherein the full-bridge converter further includes four diodes, constituting a full-bridge rectifying circuit, at the secondary side.

17. The hybrid dc-dc converter of claim 16, wherein two diodes among the four diodes located at the secondary side of the full-bridge converter and two output diodes located at a secondary side of the LLC resonant converter are connected to each other in series.

* * * * *